United States Patent [19]

Miyauchi et al.

[11] Patent Number: 4,566,765
[45] Date of Patent: Jan. 28, 1986

[54] APPARATUS FOR SUMMING SEVERAL RING-SHAPE LASER BEAMS

[75] Inventors: Tateoki Miyauchi; Mikio Hongo; Katsuro Mizukoshi, all of Yokohama; Hiroshi Yamaguchi, Fujisawa; Akira Shimase, Yokohama, all of Japan

[73] Assignee: Hitachi, Ltd., Tokyo, Japan

[21] Appl. No.: 541,439

[22] Filed: Oct. 13, 1983

[30] Foreign Application Priority Data

Oct. 15, 1982 [JP] Japan .................................. 57-179821

[51] Int. Cl.⁴ .................... G02B 5/08; G02B 27/14; B23K 9/00; G01B 11/26
[52] U.S. Cl. .................... 350/619; 219/121 L; 350/174; 356/153
[58] Field of Search ............... 350/174, 613, 614, 616, 350/617, 619; 219/121 LA, 121 LS, 121 LP, 121 LQ; 356/399, 400, 153; 362/259

[56] References Cited

U.S. PATENT DOCUMENTS 3,588,440 6/1971 Morse .................. 219/121 LA X
3,892,488 7/1975 Edmonds .................. 356/153
4,289,378 9/1981 Remy et al. .............. 219/121 LS X

FOREIGN PATENT DOCUMENTS

2402187 3/1979 France .................. 356/153

Primary Examiner—John K. Corbin
Assistant Examiner—David Lewis
Attorney, Agent, or Firm—Antonelli, Terry & Wands

[57] ABSTRACT

A light source apparatus comprises one laser oscillator, at least one other laser oscillator, a light converter for converting a laser beam emitted from the other laser oscillator into a ring-shaped laser beam, and a reflecting mirror for passing a laser light beam emitted from the one laser oscillator through the center hole of the mirror and for reflecting the ring-shaped laser beam from the other laser oscillator via the light converter, the laser beam reflected by the reflecting mirror being coaxial with and being overlapped with the laser beam transmitted through the mirror from the one laser oscillator.

15 Claims, 12 Drawing Figures

APPARATUS FOR SUMMING SEVERAL RING-SHAPE LASER BEAMS

The present invention relates to a laser source apparatus having a laser output which may be increased to a value in excess of a single laser oscillator.

As the laser processing is widely spread today, a higher output laser is increasingly demanded.

Figure 1:
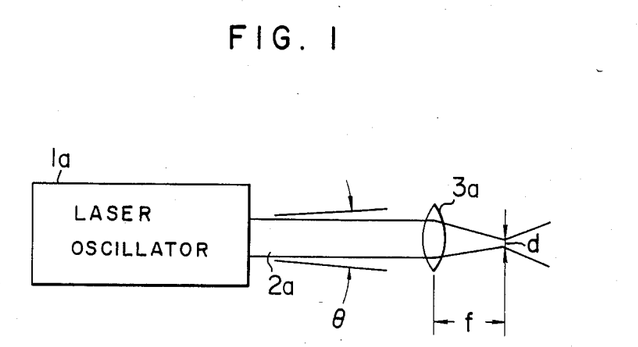
FIG. 1 is an illustration showing a typical laser source apparatus for the purpose of outlining a laser source apparatus.

Prior to detailed description, a laser source apparatus will be outlined at first. FIG. 1 shows a typical laser source apparatus. In FIG. 1, a laser beam 2a emitted from a laser oscillator 1a has a spread angle θ with respect to the beam axis and is focused to have a spot diameter d at a focus plane of an object lens 3a for machining with a distance f. Laser machining is carried out by using the laser beam thus focused to have a spot diameter d.

The spot diameter d is represented as $$d = f \cdot \theta$$

where f is the focal distance of lens 3a.

When a laser beam having a large output is needed in laser machining using a conventional laser oscillator, it is required to either develop a large output laser oscillator such as seen in the case of $CO_2$ lasers, or use laser amplifiers after a laser oscillator, as in the case of a YAG laser which uses a laser crystal.

Figure 2:
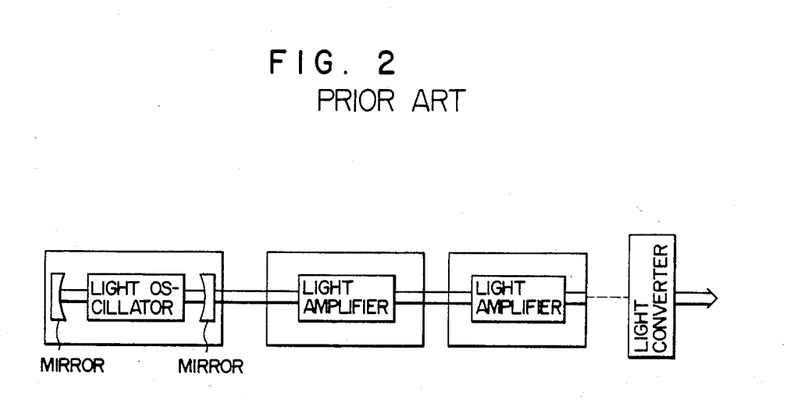
FIG. 2 is a block diagram showing a laser source apparatus using light amplifiers for attaining a larger output according to the prior art.

FIG. 2 shows how to increase the output of the laser using a light amplifier. Succeeding a laser oscillator having a light amplifier section and resonator mirrors illustrated in FIG. 2, one or more amplifiers having only a light amplifier section among components included in the laser oscillator are placed in order to amplify a laser to a high output.

Since the output power of the laser oscillator itself is inherently defined, however, there is a limit to the output power no matter how many light amplifiers are used. Especially for YAG laser, the power density of passing laser light cannot exceed the withstanding power limit of a YAG crystal. Therefore, the continuous output power is confined to at most 1 to 2 kW.

As a result, there is a difficulty in getting a high power which is required today. And so, the increasing demand for the larger laser power will not be satisfied.

Therefore, an object of the present invention is to provide a laser source apparatus feeding laser of necessary output according to a demand.

In accordance with one feature of the present invention, a conventional arrangement of light amplifiers is not used and there is provided a laser source apparatus comprising at least two laser oscillators such as well known $CO_2$ lasers or YAG lasers, at least one light converter for converting laser beam emitted from the second laser oscillator into a ring-shaped beam, at least one reflecting mirror for transmitting a laser beam emitted from the first laser oscillator through a center hole thereof and for respectively reflecting the laser beam fed from the second laser oscillator via the light converter, the laser beam reflected by the reflecting mirror being coaxial with the laser beam transmitted through the mirror, and being adjointed with the transmitted laser beam, and an adjusting means for adjusting the outputs of the laser oscillators to obtain a necessary total output power of laser beams thus adjoined.

Further, it is also possible to obtain a laser beam having a necessary spot diameter and a necessary output power by using ring-shaped reflecting mirrors having reflective surfaces so curved that focal points of reflected laser beams may match with each other.

FIG. 3 to FIG. 8 are illustrations showing embodiments of the present invention; wherein

Figure 6:
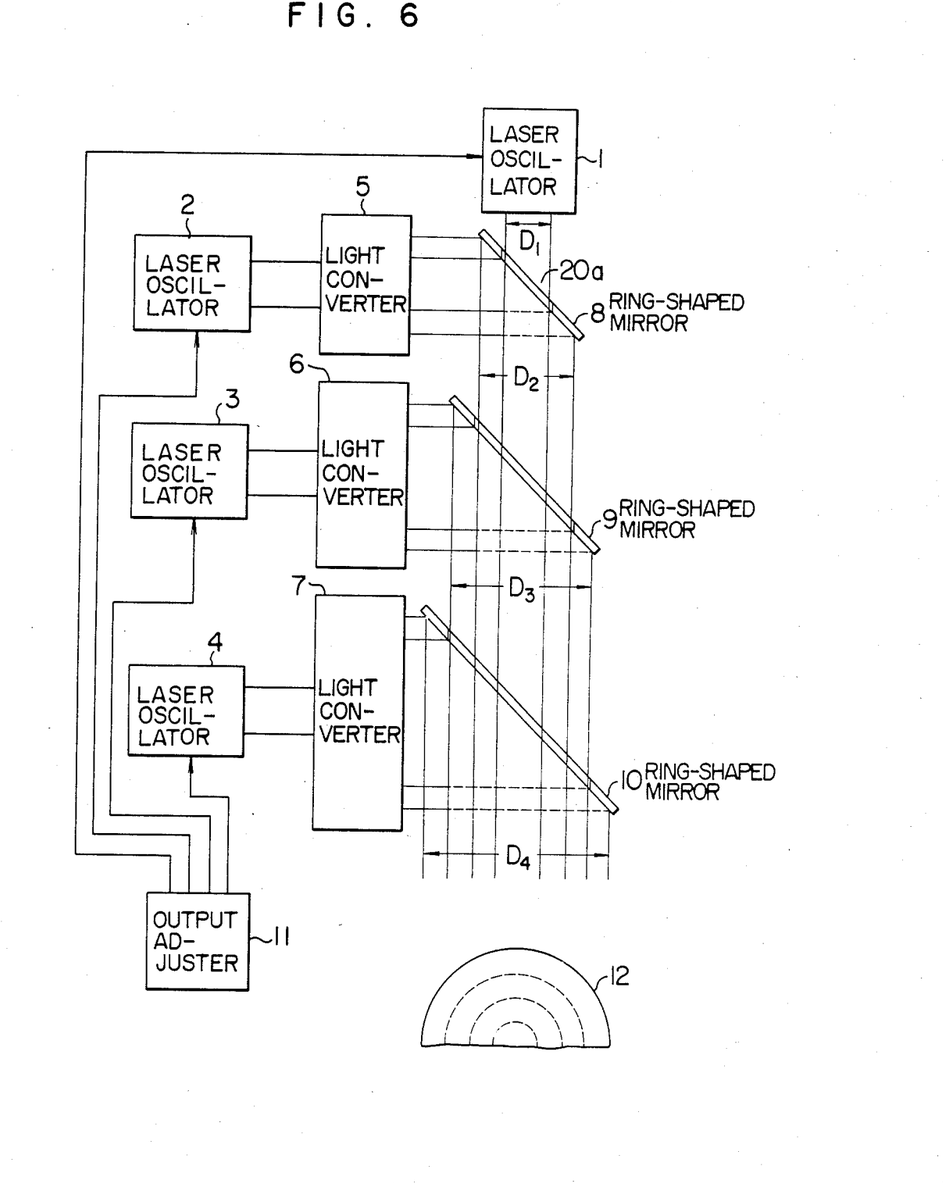
FIG. 6 shows a laser source apparatus using a number of laser oscillators.

An embodiment of the present invention will now be described in detail. Prior to the detailed description, the outline of the embodiment will now be described referring to FIG. 6. In FIG. 6, reference numerals 1 to 4 denote laser oscillators. Numerals 5 to 7 denote light converters and numerals 8 to 10 denote ring-shaped reflecting mirrors. Numeral 11 denotes a laser output adjuster.

Figure 8:
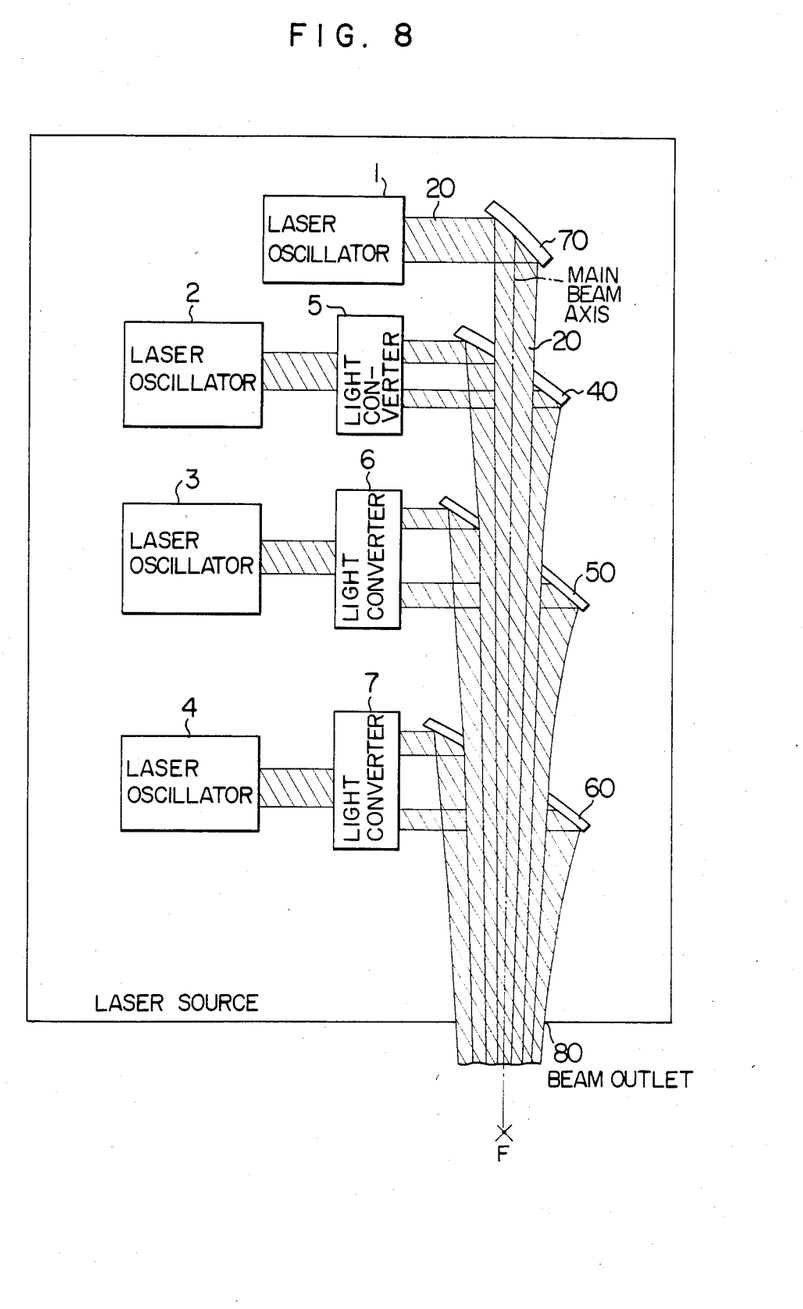
FIG. 8 shows a laser source apparatus having curved reflecting surfaces of an ordinary mirror and ring-shaped mirrors.

A laser beam 20a emitted from the laser oscillator 1 passes through center holes of ring-shaped reflecting mirrors 8 to 10. Laser beams emitted from other laser oscillators 2, 3 and 4 respectively are converted into ring-shaped laser light rays by light converters 5, 6 and 7 and thereafter applied to reflective surfaces of the ring-shaped reflecting mirrors 8, 9 and 10. The optical axes of ring-shaped laser beam reflected by the ring-shaped reflective mirrors 8, 9 and 10 are co-axially aligned with that of the laser beam transmitted through the center holes of the ring-shaped mirrors 8, 9 and 10. These laser beams are in a direction normal to the optical axis to get a large total output power. Alternatively, ring-shaped reflective mirrors 40, 50 and 60 and a reflecting mirror 70 each having a curved surface may be arranged as illustrated in FIG. 8 so that the reflected laser beams may be focused at the same focal point and overlapped. A combined output of laser beams is produced at an output end or source outlet 80.

The combined output of the laser beams thus overlapped may be adjusted by adjusting the outputs of laser oscillators 1 to 4 through the adjuster 11 but not shown in FIG. 8 for simplicity.

Figure 3:
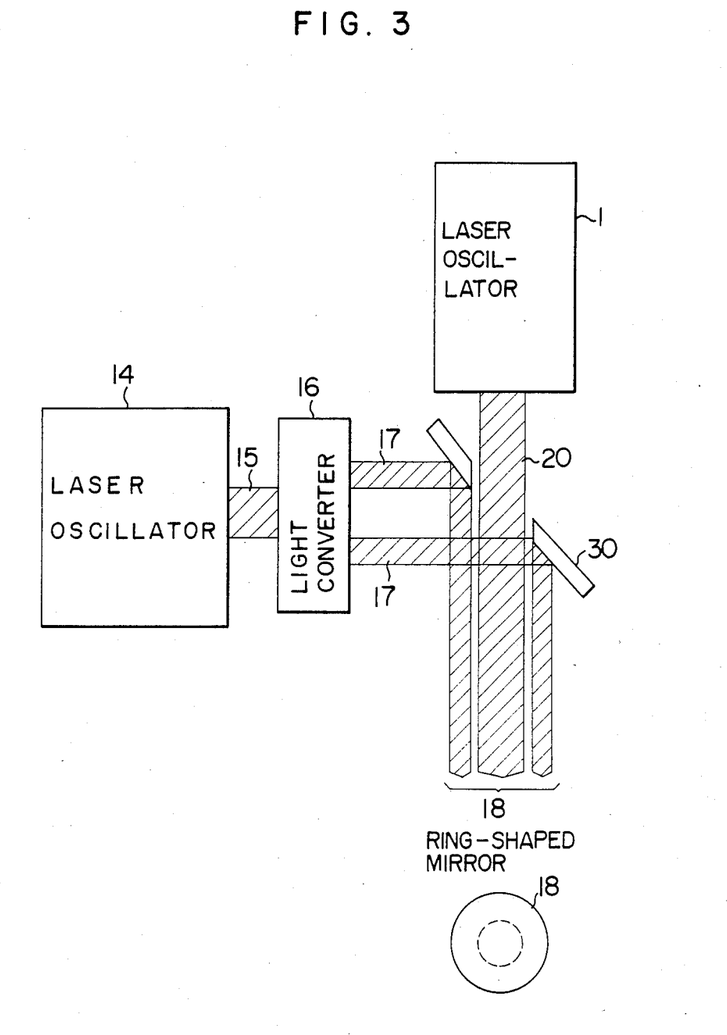
FIG. 3 shows a laser source apparatus using two laser oscillators.

Further details will now be described. FIG. 3 shows the basic embodiment of the present invention using two laser oscillators. In FIG. 3, numerals 1 and 14 denote laser oscillators; numeral 30 denotes a ring-shaped flat mirror inclined at 45 degrees with respect to an incident light, and numeral 16 denotes a light coverter. A laser beam 20 emitted from the laser oscillator 1 passes through the center hole of the ring-shaped mirror 30. A laser beam 15 emitted from the laser oscillator 14 is converted into a ring-shaped laser beam 17 by a light converter 16. The laser beam 17 is reflected by the above-described ring-shaped mirror 30. The reflected laser beam 17 and the laser beam 20 are adjoined to form a single beam 18 composed of coaxial laser beams.

If the output of the laser oscillator 1 is as large as that of the laser oscillator 14, the single beam 18 composed of the coaxial beams thus adjoined has an output which is twice as large as the output of each laser oscillator.

Figure 4A:
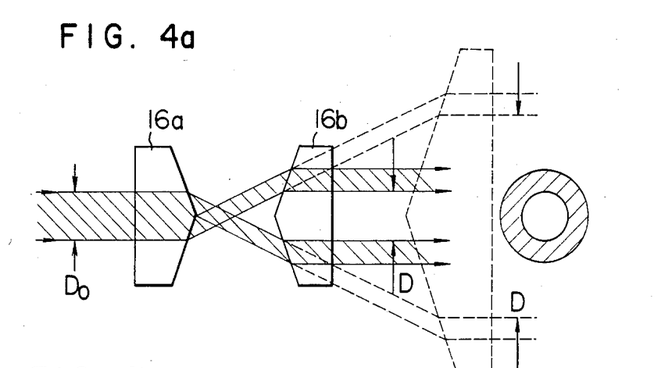
FIGS. 4a-d and FIG. 5 illustrate embodiments of a light converters according to the present invention.
Figure 4B:
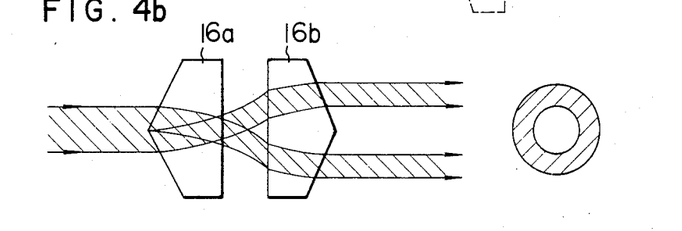
Figure 4C:
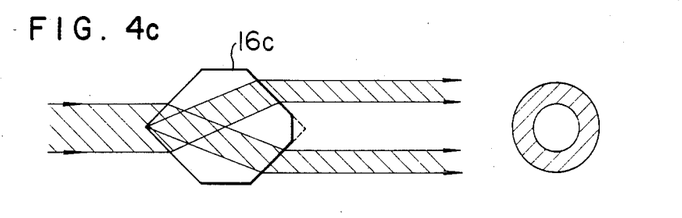
Figure 4D:
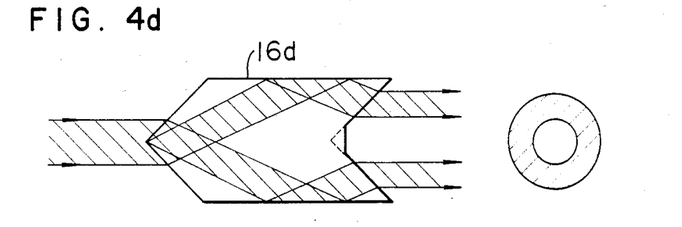
Figure 5A:
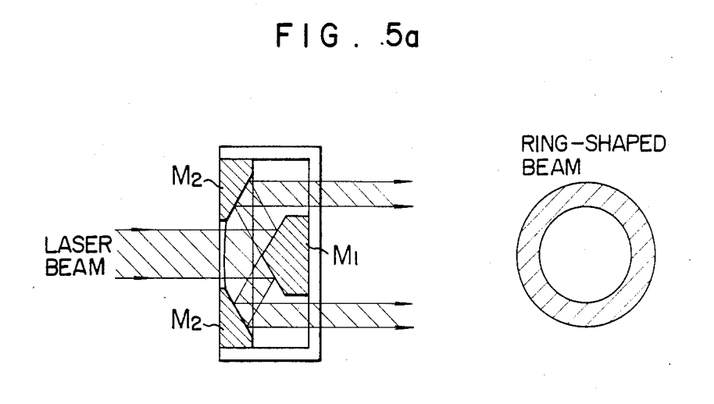
Figure 5B:
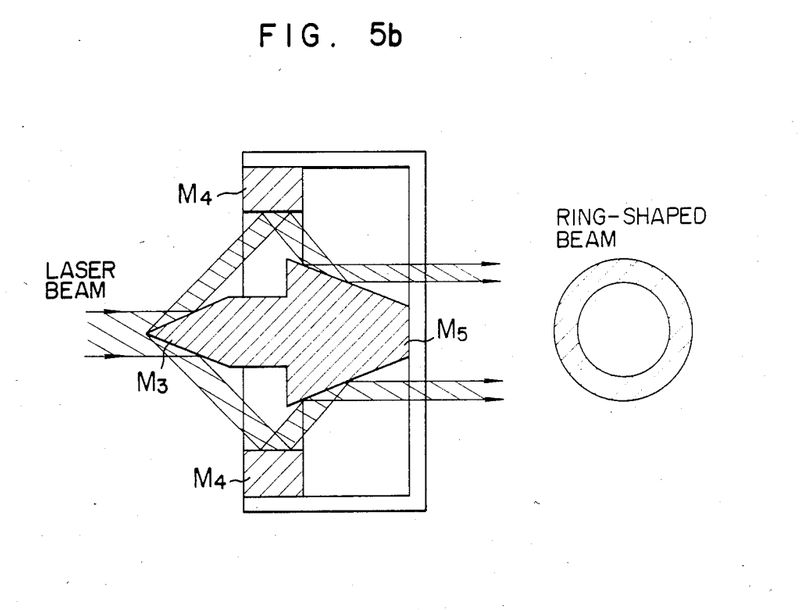

FIG. 4a to FIG. 4d as well as FIG. 5a and FIG. 5b illustrate embodiments of a light converter. In FIG. 4a, two cone prisms 16a, 16b having equal vertical angles are placed with vertical angles confronting each other. It is possible to convert the incident laser beam into a ring-shaped light beam having an arbitrary diameter by suitably choosing the distance between two cone prisms 16a, 16b. At this time, the exterior diameter of the ring-shaped beam is $D_o + D$.

FIG. 4b shows a modification to the light converter illustrated in FIG. 4a. In FIG. 4b, two cone prisms 16a, 16b having equal vertical angles are placed with their bottom surfaces confronting each other for attaining a small incident angle of laser beam onto the boundary surfaces. In the same way as FIG. 4a, it is possible to obtain a ring-shaped light beam having an arbitrary diameter by arbitrarily choosing a distance between both bottom surfaces. FIG. 4c shows an integrated prism the composed of cone sections having equal vertical angles. In this case, adjustment cannot be carried out unlike light converters illustrated in FIG. 4a and FIG. 4b since the prism is formed according to the diameter of the ring-shaped light beam. However, it is possible to obtain a ring-shaped light beam having a precise, constant diameter. FIG. 4d shows an alternative integrated prism 16d composed of a convex cone prism 16d and a concave cone prism having equal vertical angles which are joined together back to back. At the cylindrical surface on the way, total reflection is performed. Whereas the central part and the exterior peripheral part of a beam are interchanged in FIG. 4a to FIG. 4c, they are not interchanged in FIG. 4d. In the embodiment of a light converter illustrated in FIG. 5a, the central part and the exterior peripheral part of the beam are not interchanged. In FIG. 5b, they are interchanged.

FIG. 6 shows another embodiment of the present invention. In FIG. 6, a larger number of laser oscillators, as compared with the embodiment illustrated in FIG. 3, are provided and laser beams emitted from those laser oscillator are adjoined.

Similarly to the embodiment illustrated in FIG. 3, plurality of n laser oscillators 1 to 4, (n 2, and n being 4 herein), $(n-1)$ light converters 5 to 7 and $(n-1)$ ring-shaped mirrors 8 to 10 in this embodiment are mutually arranged as follows. That is to say, laser beams emitted from laser oscillators 2 to 4 are respectively converted into ring-shaped beams respectively having interior diameters/exterior diameters of $D_1/D_2$, $D_2/D_3$, and $D_3/D_4$ by light converters 5 to 7. The laser beams thus converted are so reflected by ring-shaped mirrors 8 to 10 which are total reflection mirrors having incident angles of 45° as to have the same light axes as that of the laser beam 20a emitted from the laser oscillator 1 and passed through the center holes of the ring-shaped mirrors 8 to 10. As a result, a single beam 12 composed of 4 coaxial light beams is formed. The output adjuster 11 is used to adjust or control the outputs of the laser oscillators 1 to 4.

In FIG. 8, reflective surfaces of the mirrors 40, 50, 60 and 70 are curved so that all the laser beams focus on one focal point F forming a small beam diameter. The distance between the output end 80 and the focal point F is 10 to 100 m for $CO_2$ lasers and 1 to 10 m for YAG lasers. In FIG. 8, a laser light beam 20 emitted from a laser oscillator 1 is applied to the mirror 70 having a curved surface. The beam reflected by the mirror 70 is passed through the center holes of ring-shaped mirrors 40, 50 and 60 to be focused at a particular position. On the other hand, laser beams emitted from laser oscillators 2, 3 and 4 are converted into ring-shaped beams by light converters 5 to 7 and thereafter applied to reflective surfaces of ring-shaped mirrors 40, 50 and 60. The laser beams thus applied are reflected by the mirrors 40, 50 and 60 so as to have the same axis and focus point as the above-described laser beam 20, thus forming a single beam composed of coaxial beams.

The operation of the above embodiments will now be described.

Figure 7:
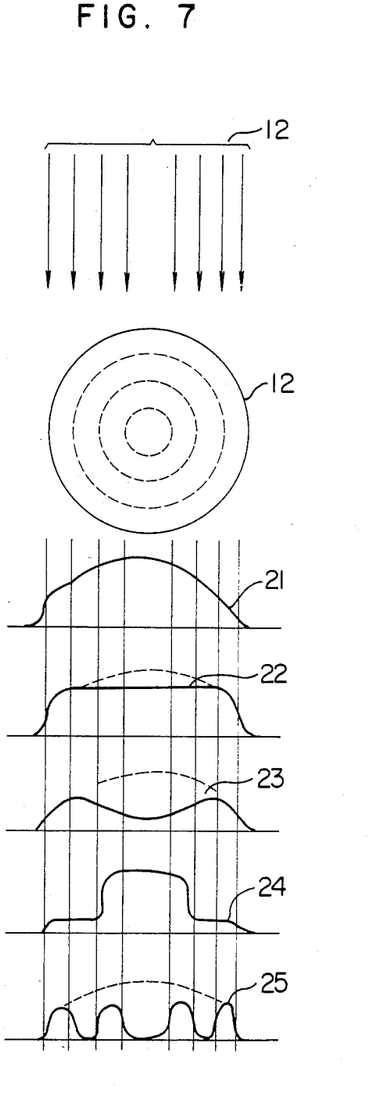
FIG. 7 shows output distribution of the combined laser beams which change with adjuster control.

In FIG. 7, the outputs of respective laser oscillators are adjusted by using the output adjuster 11 illustrated in FIG. 6.

FIG. 7 corresponds to the embodiment illustrated in FIG. 6 and shows distribution in a laser output 20a when the beam composed of coaxial light beams is $D_4$ in diameter.

In FIG. 7, a reference numeral 21 represents an output distribution when the outputs of the laser oscillators 1, 2, 3 and 4 are equal to each other, which exhibits a maximum value at its central part. An output distribution 22 which is flat is obtained by suitably suppressing the outputs of laser oscillators 1, 2 and 3.

It thus becomes possible to obtain a desired output distribution such as an output distribution 23 having a low output at the central part, an output distribution 24 having a large output only at the central part, and a multiple-ring shaped output distribution 25 according to the application by suitably adjusting the outputs of a plurality of laser oscillators by the output adjuster 11.

The output distributions 21 to 25 are obtained as the sum of outputs of respective laser oscillators when laser beams emitted from a plurality of laser oscillators are adjoined to form a single beam composed of coaxial laser beams.

In the laser source apparatus according to the embodiment of the present invention as heretofore described, laser beams emitted from a plurality of laser oscillators are overlapped to form a single beam composed of coaxial light beams by using light converters and ring-shaped mirrors. Without being limited by the output of a laser oscillator, therefore, it is possible to obtain a laser beam having a large power corresponding to the sum of the outputs of a plurality of laser oscillators. Thus, the industrial application field including such as heat treatment and alloying process has been significantly expanded. It is also possible to change the output distribution according to the application, largely contributing to development of novel techniques in laser processing.

Further, by focusing laser beams and reducing the beam diameter through the use of curved reflection surfaces of the mirrors, the number of laser oscillators may be increased, resulting in a further increased output. As a result, it is possible to realize a laser source apparatus meeting the necessity for a larger output power of the order of 10 kW up to the order of megawatts (MW).

We claim:

1. A laser source apparatus comprising:
    n-laser oscillators of a predetermined type ($n \geq 2$, an integer) for generating laser beams to be aligned along a main beam axis;

(n−1) light converters coupled with (n−1) ones of said laser oscillators, each converting a laser beam generated from the corresponding laser oscillator into a substantially ring-shaped laser beam;

(n−1) reflecting mirrors disposed on the main beam axis at an angle and adapted to receive the ring-shaped laser beams from said (n−1) light converters, respectively, each of said reflecting mirrors having a through-hole of dimensions of enough to transmit an entering laser beam;

a non-ring-shaped laser beam emitted from one laser oscillator other than said (n−1) laser oscillators being transmitted to travel on the center of said main beam axis, whereby the laser beams reflected by said reflecting mirrors and the non-ring-shaped beam emitted from said one laser oscillator are arranged coaxially of the main beam axis to produce a combined laser beam of on output power of the sum of said laser beams at an output end of the apparatus.

2. The apparatus according to claim 1, further comprising a reflecting mirror disposed between said one laser oscillator and said main beam axis for reflecting a laser beam from said one laser oscillator to thereby travel on the center of said main beam axis.

3. The laser source apparatus according to claim 2, wherein each of said reflecting mirrors has a curved reflective surface to produce at the output end a combined laser beam such that the laser beams emitted from said laser oscillators are in section overlapped with each so as to be focused at the same point with a combined laser beam spot of small diameter.

4. The apparatus according to claim 1, further comprising oscillation control means connected to said n-laser oscillators for controlling the laser oscillation of each laser oscillator and thereby control the output power distribution of the combined laser beam.

5. The laser source apparatus according to claim 1, wherein each of said reflecting mirrors has a flat reflective surface to produce at the output end a combined laser beam such that the laser beams emitted from said laser oscillators are coaxially and tightly adjacent to each other in section.

6. The laser source apparatus according to claim 1, wherein said reflecting mirrors have through-holes whose diameters are increased with downstream reflecting mirrors on said main beam axis so as to allow transmission of laser beams entering from upstream mirrors.

7. The laser source apparatus according to claim 1, wherein said angle for the (n−1) reflecting mirrors is 45 degrees.

8. The laser source apparatus according to claim 1, wherein said laser oscillators of the predetermined type are one of $CO_2$ and YAG laser oscillators.

9. The laser source apparatus according to claim 8, wherein n is at least 3.

10. The laser source apparatus according to claim 8, wherein the combined laser beam has a continuous output power of between 10 KW and 1 MW.

11. A laser source apparatus comprising:
a first laser oscillator of a predetermined type;
a plurality of second laser oscillators of the predetermined type for outputting a laser beam having the same wavelength as that of said first laser oscillator;
a plurality of light converters coupled respectively with said plurality of second laser oscillators for converting a laser beam emitted from the associated second laser oscillator into a ring-shaped laser beam;
a first reflecting curved mirror for focusing a laser beam emitted from said first laser oscillator the center of a main beam axis to a focal point;
a plurality of second reflecting curved mirrors disposed on the main beam axis at an angle and adapted to receive ring-shaped laser beams from said light converters, respectively, said second reflecting curved mirrors having through-holes whose diameters are increased with downstream reflecting mirrors on the main beam axis so as to allow transmission of laser beams entering from the first reflecting curved mirror and upstream reflecting curved mirrors, each of said second reflecting curved mirrors having a curved reflective surface to produce a combined laser beam focused at the same focal point;
whereby the laser beams reflected by said reflecting mirrors are aligned on the main beam axis to produce a focused and combined laser beam with a power of the sum of said laser beams at an output end of the apparatus.

12. A laser source apparatus according to claim 11, further comprising a laser oscillator output adjuster for adjusting the output power of each of said first and second laser oscillators.

13. A laser source apparatus according to claim 14, wherein said light converter comprises at least two light elements, each of said light elements having a portion of a circular cone.

14. A laser source apparatus according to claim 11, wherein the output power at the focused laser beam is on the order of 10 kw to 1 MW.

15. A laser source apparatus according to claim 11, wherein the predetermined type of said first and second laser oscillators is one of a $CO_2$ and a YAG laser oscillator.

* * * * *